United States Patent [19]

Heard

[11] Patent Number: 5,716,556
[45] Date of Patent: Feb. 10, 1998

[54] METHOD FOR PRODUCING A POLYMERIC OPTICAL WAVEGUIDE

[75] Inventor: David Heard, Kashiwa, Japan

[73] Assignee: Sharp Kabushiki Kaisha, Osaka, Japan

[21] Appl. No.: 567,242

[22] Filed: Dec. 5, 1995

[30] Foreign Application Priority Data

Dec. 5, 1994 [JP] Japan ................................ 6-300807

[51] Int. Cl.⁶ ................................................. B29D 11/00
[52] U.S. Cl. ............................................ 264/1.24; 264/102
[58] Field of Search ............................... 264/1.24, 1.1, 264/1.27, 101, 102

[56] References Cited

U.S. PATENT DOCUMENTS

| | | |
|---|---|---|
| 4,896,930 | 1/1990 | Tsuchitani et al. . |
| 5,136,678 | 8/1992 | Yoshimura . |
| 5,265,184 | 11/1993 | Lebby et al. . |
| 5,281,372 | 1/1994 | Hayashi et al. ................. 264/102 |

FOREIGN PATENT DOCUMENTS

| | | |
|---|---|---|
| 0 246 613 A2 | 11/1987 | European Pat. Off. . |
| 0 334 363 | 9/1989 | European Pat. Off. . |
| 3809182 A1 | 9/1988 | Germany . |
| 58-149008 | 9/1983 | Japan ................................ 264/1.24 |

OTHER PUBLICATIONS

Patent Abstracts of Japan, vol. 016, No. 292 (P-1377), Jun. 29, 1992.

Patent Abstracts of Japan, vol. 014, No. 442 (P-1109), Sep. 20, 1990.

Primary Examiner—Mathieu D. Vargot
Attorney, Agent, or Firm—Birch, Stewart, Kolasch & Birch, LLP

[57] ABSTRACT

A method for producing a polymeric optical guide including steps of allowing the patterned surface of a patterned substrate (1) on which the pattern of grooves to become capillaries is provided to contact with a plane substrate (2), forming capillaries (1a through 1f) from the grooves, filling the capillaries with a monomer solution (6) which is the material for the core of the optical waveguide utilizing a capillary phenomenon, and polymerizing the monomer solution.

11 Claims, 6 Drawing Sheets

METHOD FOR PRODUCING A POLYMERIC OPTICAL WAVEGUIDE

BACKGROUND OF THE INVENTION

1. Field of the Invention

The present invention relates to a method for producing a polymeric optical waveguide used in various optical devices such as optical interconnects and image scanners.

2. Description of the Related Art

An optical waveguide is formed when a dielectric material of refractive index $n_1$ is placed between another dielectric material of refractive index $n_2$, where $n_1$ is greater than $n_2$. On entering the guide, because of the difference in the refractive indices, the light is repeatedly totally internally reflected and travels along the path of the guide. In this way light is transmitted from one point to another.

There are two types of optical waveguides: a planer type optical waveguide and a channel type optical waveguide. A planer type optical waveguide has a portion through which light is guided (core) formed in a plane, while a channel type optical waveguide has a core formed as a channel. That is, in a planer type optical waveguide, the light is constrained in one direction, while in a channel type optical waveguide, the light is constrained in two directions. In this way, light can be transmitted even if the guide is curved.

There are a number of methods for producing an optical waveguide using both inorganic or organic materials. Using inorganic materials, an ion exchange process is usually used to locally change the index of refraction. For example, sodium ions in glass may be exchanged with silver ions by immersing a glass sheet in a vessel containing molten silver nitride for a suitable period of time; typically 330° C. for 30 minutes. The region containing silver ions has a higher index of refraction, and acts as the core of the optical waveguide. Waveguides formed from inorganic materials, due to both material and processing costs, tend to be expensive.

An optical waveguide may also be produced using organic materials. For example, there is a method using the following principle. A photosensitive dopant is first added to a polycarbonate based polymeric material. This is then irradiated with ultraviolet light to selectively polymerize the additive. Then the unexposed additive is removed by heating, leaving the unexposed region with a higher refractive index than its surroundings. Although the principle of this method is simple, a large number of manufacturing processes are required to produce a practical device.

Other methods for producing optical waveguides using organic materials include selective removal of a thin film using either a laser beam, reactive ion etching (RIE), or wet etching.

One method which shows promise for low cost mass production was reported in "Fabrication of Low Polymer Waveguides using Injection Moulding Technology", Electronics Letters, 1993, Vol. 29, No. 4, pp. 309–401. In this method, a patterned substrate on which patterns of a groove constituting a capillary is formed by injection molding using a polymer material. This substrate is then used to form a channel type polymeric optical waveguide.

This method will be described referring to FIGS. 5 to 7.

First, the fabrication of a mold for injection molding for producing a patterned substrate on which a pattern of a groove constituting a capillary will be described referring to FIGS. 5A to 5E.

As FIG. 5A shows, a photoresist 21 for ultraviolet light is applied to a silicon substrate 20. Since the thickness of the photoresist 21 will eventually become the depth of the groove in the patterned substrate, it should be determined according to the design of the patterned substrate. A silicon substrate is used as the substrate. This is because electroplating is used in the subsequent process. Various other types of substrates may also be used. What is required for the substrate is a conductive substrate such as an ITO substrate, which is a glass substrate coated by indium-tin oxide.

As FIG. 5B shows, the substrate is exposed to ultraviolet light 23 through a mask 22 on which the required waveguide pattern is drawn, and then developed to pattern the photoresist 21 as FIG. 5C shows.

Next, as FIG. 5D shows, a metallic material such as nickel and zinc is deposited on the patterned photoresist 21 by electroplating to form a thin metallic plate 24. This thin metallic plate 24 becomes the mold as FIG. 5E shows, which is used in the injection moulding process. Such a mold 25 may be fabricated using a metal grinding method if it is to be used for molding a core of a relatively large optical waveguide.

If the mold 25 fabricated as described above is used, a patterned polymeric substrate 1 consisting of a polymer material such as polymethyl methacrylate (PMMA) may be produced using an ordinary injection molding machine as FIG. 6 shows. The injection molding technique used here is an ordinary technique used in manufacturing optical disks and the like, and a patterned substrate having for example a groove with a square cross section of 6 micrometers wide and 6 micrometers deep may be produced using a polymer material such as PMMA.

Next, the groove 1 of the patterned substrate thus produced is filled with a polymer precursor which is the material of the polymer for the core of the waveguide. A plane substrate consisting of a polymer material such as PMMA is then allowed to contact with the groove of the patterned substrate, and the precursor material is polymerized by ultraviolet irradiation to form the core of the optical waveguide consisting of a polymer material such as deuterium substituted ethyleneglycol dimethacrylate (EGDMA). The term "deuterium substituted" means that hydrogen atoms have been substituted with deuterium atoms.

Materials having different indices of refraction, such as the combination of PMMA and deuterium-substituted EGDMA, are used for patterned and plane substrates and the core of the optical waveguide respectively so that the index of refraction of the core of the optical waveguide is higher. (In the case of the combination of PMMA and EGDMA, EGDMA has a higher index of refraction than PMMA.)

Thus as FIG. 7 shows, a polymeric optical waveguide can be produced, in which the plane substrate 2 constitutes the upper clad, the patterned substrate 1 constitutes the lower clad, and the polymer material formed in the groove of the patterned substrate 1 constitutes the core 8.

However, in practice, in the optical waveguide produced by the method for producing a polymeric optical waveguide described above, a thick film of the core material remains between the plane substrate 2 and the patterned substrate 1, to form a gap 8a as thick as about 1–10 micrometers, as shown in FIG. 8. Due to the gap 8a, light from the waveguide leaks into the gap 8a, and is diffused throughout the device. The thickness of the film between the plane substrate 2 and the patterned substrate 1 must be less than that required to support waveguiding. This parameter depends on the wavelength of the radiation and the refractive index of the core and clad materials but even a thickness of 1 micrometer or less may cause loss.

The present invention intends to solve such problems.

SUMMARY OF THE INVENTION

It is an object of the present invention to provide a method for producing a polymeric optical waveguide comprising the steps of forming a capillary by allowing the patterned surface of a patterned substrate on which the pattern of a groove to become the capillary to contact with a plane substrate, and forming a core consisting of a polymer material in the capillary, in which there is no gap between the patterned substrate and the plane substrate, thus producing a polymeric optical waveguide which has no leakage of light from the cores, and which excels in optical waveguide properties.

In order to solve the above problems, in the method for producing a polymeric optical waveguide according to the present invention, the patterned surface of a patterned substrate on which the pattern of a groove to become a capillary is allowed to contact with a plane substrate to form the capillary from the groove, the capillary is filled with a monomer solution, which is the material for the core of the optical waveguide using a capillary action, and the monomer solution is polymerized.

In another embodiment of a method for producing a polymeric optical waveguide according to the present invention, the patterned surface of a patterned substrate on which the pattern of a groove to become a capillary is allowed to contact with a plane substrate to form the capillary from the groove, an open end of the capillary is sealed. The inside of the capillary and around a monomer solution, which is the material for the core of the optical waveguide is then evacuated. The other open end of the capillary which is not sealed is dipped in the monomer solution, the capillary is filled with the monomer solution by gradually raising the pressure around the monomer solution from a vacuum to atmospheric pressure. Then the monomer solution is polymerized.

In further embodiment of a method for producing a polymeric optical waveguide according to the present invention, the patterned surface of a patterned substrate on which the pattern of a groove to become a capillary is allowed to contact with a plane substrate to form the capillary from the groove. An open end of the capillary is dipped in a monomer solution, which is the material for the core of the optical waveguide, the capillary is filled with the monomer solution by evacuating the capillary from the other open end of the capillary. The monomer solution is then polymerized.

According to the method for producing a polymeric optical waveguide of the present invention, since the patterned substrate and the plane substrate are clamped prior to filling the grooves with the monomer solution, which is the material for the core, no gap is formed in the interface between the patterned substrate and the plane substrate by the surplus monomer solution as in previous methods. In the interface of these substrates, therefore, no crosstalk occurs due to the leakage of light from each core, and incident light is guided accurately. The substrates are fabricated using injection molding, a curved core, or a substrate having integrated device components may then be fabricated in a single injection molding, accommodating the design of various shapes, thus the optical waveguide having a high degree of design freedom and excellent optical waveguide properties is produced.

Furthermore, according to the present invention, since change in pressure by vacuum inside the capillary and around the monomer solution is used to assist a capillary action when the capillary of the optical waveguide is filled with the monomer solution, the filling process is quickly performed even when a relatively long capillary is filled with a relatively viscous monomer solution. And, thus, the optical waveguide is produced with a very high productivity.

Also, according to the present invention, since the capillary of the optical waveguide is filled with the monomer solution by evacuating the capillary from an open end of the capillary to assist the capillary action, the filling process is quickly performed even when a relatively long capillary is filled with a relatively viscous monomer solution. And, thus, the optical waveguide is produced with a very high productivity.

According to the present invention, therefore, since no gap is formed in the interface between the patterned substrate and the plane substrate, no crosstalk occurs due to the leakage of light between cores, and a polymeric optical waveguide with an excellent optical waveguide performance is produced.

Further objects and advantages of the present invention will be apparent from the following description of the preferred embodiments of the present invention as illustrated in the accompanying drawings.

DESCRIPTION OF THE PREFERRED EMBODIMENTS

The embodiments of the present invention will be described referring to drawings. The same symbols will be used for the same components as described in prior art.

As the first embodiment, a method for producing a polymeric optical waveguide utilizing change in pressure by vacuum inside the capillary and around the monomer solution to assist a capillary phenomenon when the capillary of the optical waveguide is filled with the monomer solution is described. In this embodiment, polymethyl methacrylate (PMMA) is used as the material for the patterned substrate and the plane substrate, and diallyl isophthalate (DAI) is used as the material for the core of the optical waveguide.

Since the patterned substrate may be fabricated in the same manner as what was described in the prior art method, the fabrication of the patterned substrate in this embodiment is described in detail referring to FIGS. 5A to 5E which were used for describing the prior art method.

Figure 5A:
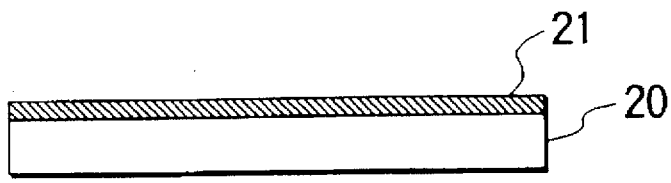
FIGS. 5A, 5B, 5C, 5D, and 5E are diagrams illustrating the process for fabricating the mold for the patterned substrate constituting the polymeric optical waveguide.
Figure 5B:
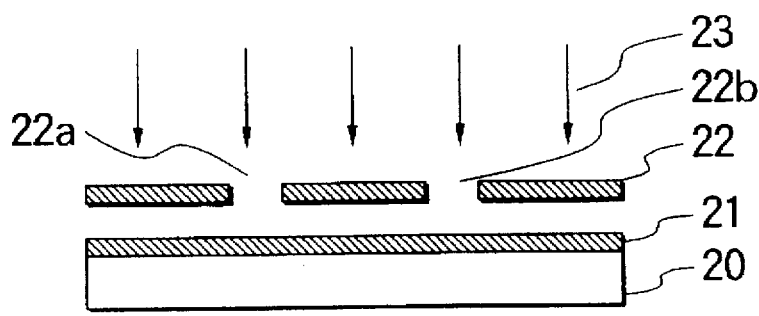
Figure 5C:
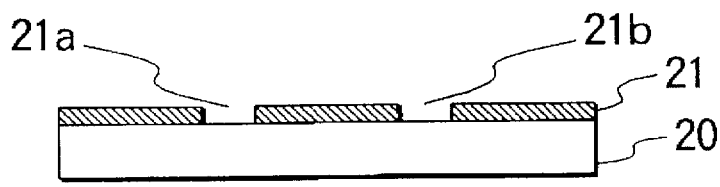

First, as FIG. 5A shows, a photoresist film 21 of a thickness of 8 micrometers is formed on a silicon substrate 20, then, as FIG. 5B shows, a groove pattern is formed using photolithography. That is, when a mask 22 is allowed to contact with this photoresist film 21, and exposed to ultraviolet light 23, the patterns of grooves 22a and 22b on the mask 22 are transferred on to the photoresist film 21. Then, as FIG. 5C shows, the patterns of grooves 21a and 21b, which will constitute capillaries are formed. Here, the width of these grooves 21a and 21b is also 8 micrometers.

Figure 5D:
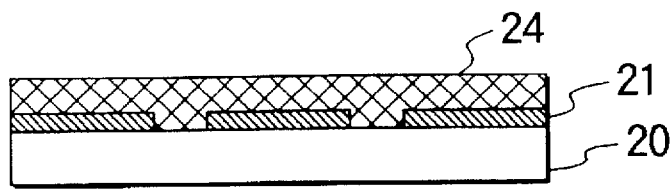

On the surface of the patterned photoresist film, a thin nickel film 24 of a thickness of 10 micrometers is formed by electroplating using a nickel chloride solution as FIG. 5D shows. On the surface opposite to the patterned surface of the thin metal film 24 thus formed, a support plate (not shown) is bonded using an epoxy-based adhesive.

Figure 5E:
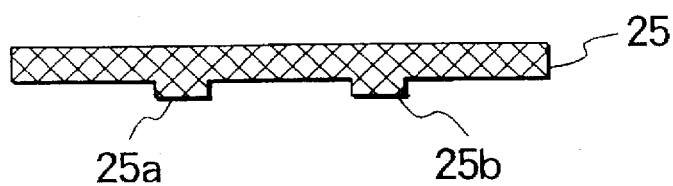

Finally, the thin metal film 23 is separated from the silicon substrate 20 by dissolving the photoresist film 1 using a resist remover to complete a mold 25 having a projecting pattern with rectangular projections 25a and 25b of a height of 8 micrometers, which can be used in injection molding machines, as FIG. 5E shows.

Figure 6:
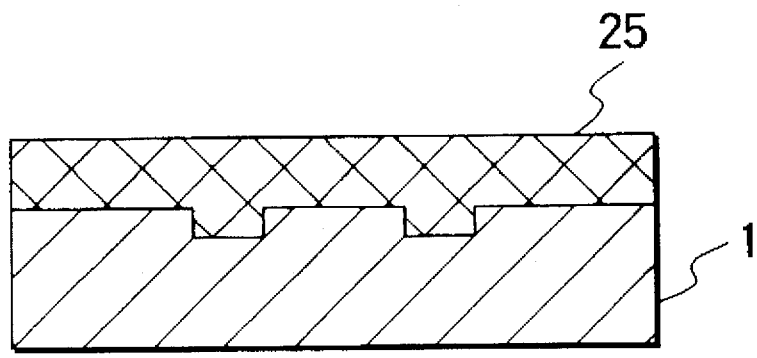
FIG. 6 is a diagram illustrating the process for fabricating the patterned substrate constituting the polymeric optical waveguide using the mold.
Figure 7:
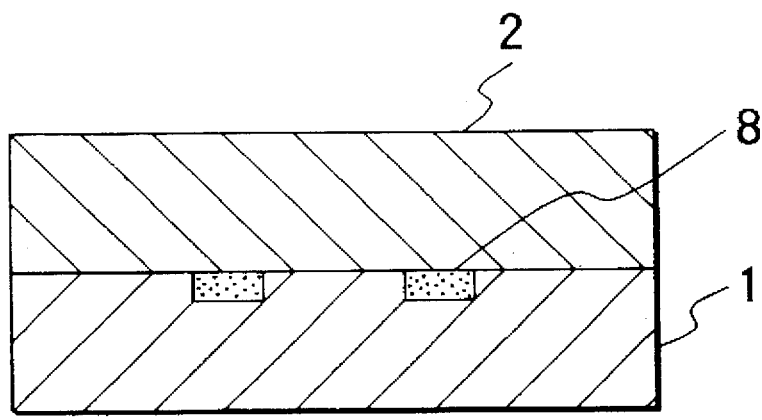
FIG. 7 is a diagram illustrating the process according to a prior art method for producing a polymeric optical waveguide.
Figure 8:
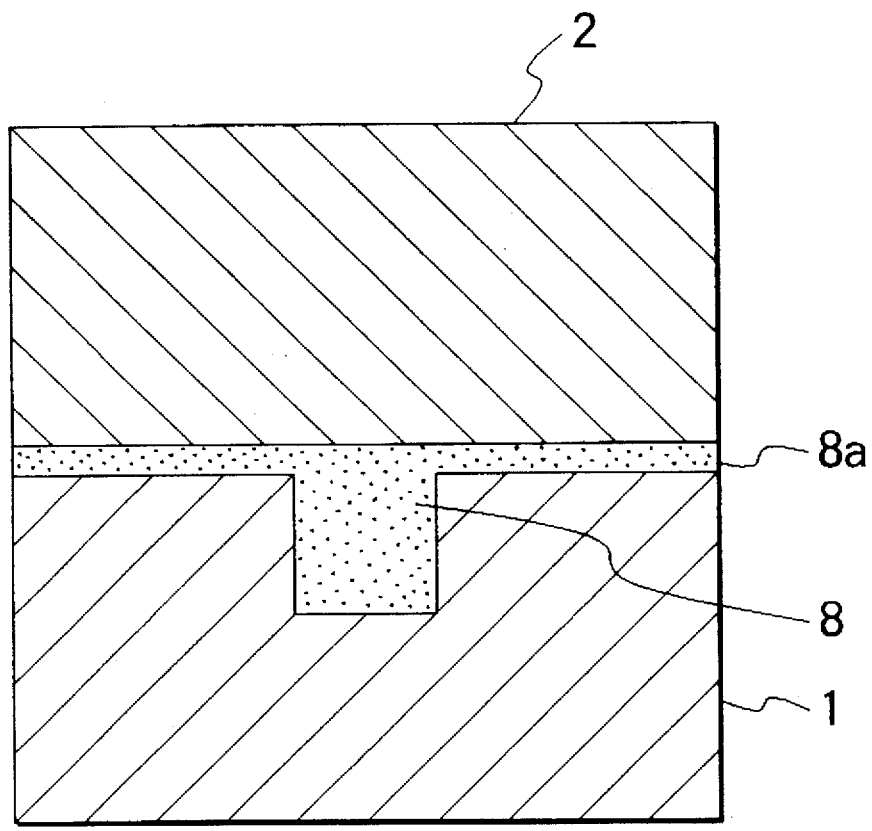
FIG. 8 is an enlarged view of an end of the core of a polymeric optical waveguide produced according to a prior art method for producing a polymeric optical waveguide, from which light comes out.

By the use of the mold 25 fabricated as described above, a patterned substrate 1 having a groove pattern can be produced by injection molding using PMMA as the polymer material in the same manner as in the prior art method described above, as shown in FIG. 6. In this embodiment, the thickness of the patterned substrate 1 was 2 mm where there are no grooves. The plane substrate shown as 2 in FIG. 7 can be also produced by injection molding using PMMA as the polymer material, and in this embodiment, a substrate of a thickness of 2 mm was produced by injection molding. Here, PMMA is used because it is suitable for injection molding, and excels in optical properties.

The patterned substrate 1 had a thickness of 2 mm as described above, a length (along the lengthwise direction of the groove) of 5 cm, and a width (along the transverse direction of the groove) of 2.5 cm. The length and the width of the plane substrate were the same as those of the patterned substrate 1, i.e., 5 cm and 2.5 cm, respectively.

Next, the process to make the patterned substrate contact with the plane substrate thus produced will be described referring to FIGS. 1A and 1B.

Figure 1A:
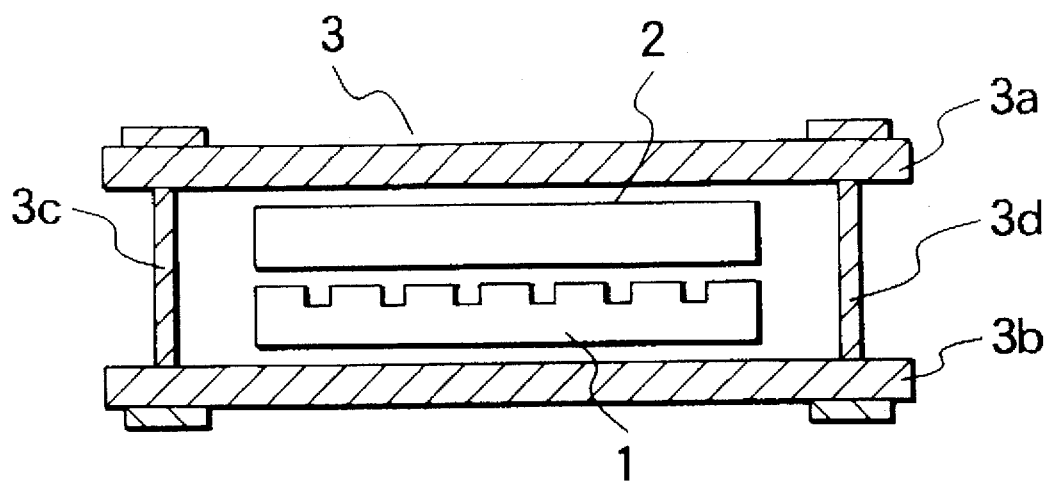
FIGS. 1A and 1B are diagrams illustrating the process for clamping the patterned substrate and the plane substrate, and the process for sealing the substrates of the first embodiment according to the present invention.

As FIG. 1A shows, the patterned substrate 1 and the plane substrate 2 are held in a clamping tool 3, so that the clamping tool 3 makes the patterned substrate 1 contact with the plane substrate 2. The grooved part of the patterned substrate 1 then forms capillaries 1a, 1b, 1c, 1d, 1e and 1f. Of four sides formed when the patterned substrate 1 is made to contact with the plane substrate, two sides 10b and 10c, and the side corresponding to the back of the paper in FIGS. 1A and 1B (not shown) except the side 10a where there are an open end of each of capillaries 1a through 1f, which acts as the inlet of the monomer solution, are sealed using a sealing resin 11 such as an epoxy resin as FIG. 1B shows. Thereby the other open ends of the capillaries 1a through 1f are also sealed, and thus the other open ends of capillaries 1a through 1f do not act as the inlet of the monomer solution.

The clamping tool 3 comprises two metal plates 3a and 3b of an aluminum alloy having a thickness of 5 mm, and a total of six screws including screws 3c, 3d, (and four others not shown). The clamping tool 3 is fixed at the circumference using six screws, so as to exert pressure to make the patterned substrate 1 contact with the plane substrate 2 without bending or breaking the patterned substrate 1 and the plane substrate 2.

When the patterned substrate 1 and the plane substrate 2 are fixed using the clamping tool 3, since a high-accuracy optical waveguide cannot be formed if the patterned substrate 1 and the plane substrate 2 are curved, pressure must be applied evenly so as not to bend the patterned substrate 1 and the plane substrate 2.

Also, the patterned substrate 1 and the plane substrate 2 must be clamped so that their surfaces contact each other without air bubbles.

Although the clamping tool used in this embodiment comprises metal plates and screws made of an aluminum alloy, it is not limited to such a structure, but a hydraulic mechanism may be used for applying pressure to make the substrates contact to each other, and the clamping tool should be designed to suit the size and shape of the substrates.

Next, the process to fill the capillaries between the patterned substrate and the plane substrate with the monomer solution which is the material of the core will be described referring to FIGS. 2A and 2B.

Figure 2A:
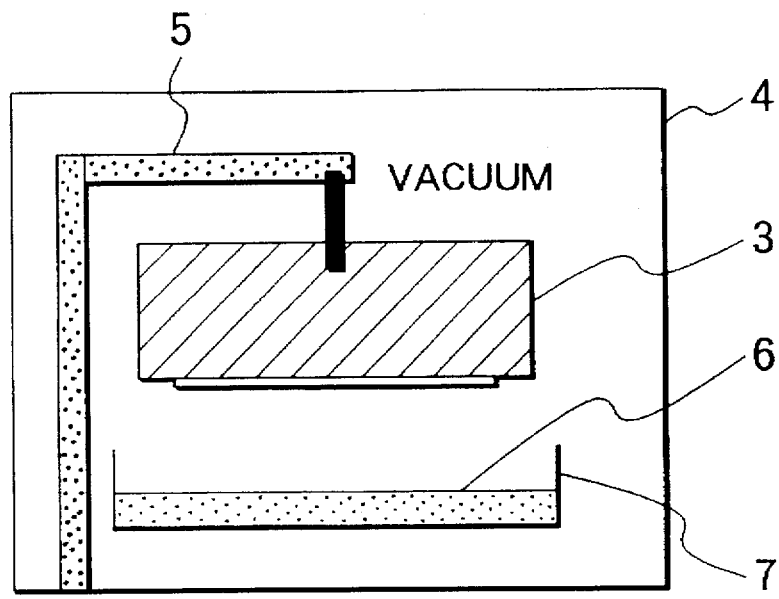
FIGS. 2A and 2B are diagrams illustrating the process for filling the capillaries with a monomer solution which is the material for the core of the first embodiment according to the present invention.
Figure 2B:
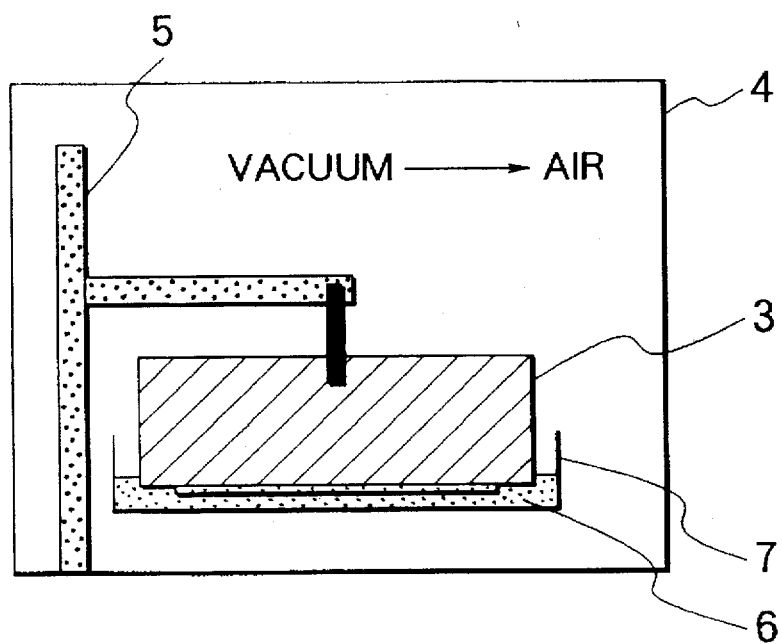

The patterned substrate 1 and the plane substrate 2 fixed using the clamping tool 3 as described above are held by a holder 5 in the vacuum chamber 4 as shown in FIG. 2A. In this embodiment, the holder 5 has a mechanism to move the clamping tool 3 in the vertical direction. Also in the vacuum chamber 4, a vessel 7 containing a DAI monomer solution 6 which contains 5 percent benzoyl peroxide is placed immediately under the clamping tool 3. When heated, benzoyl peroxide contained in the DAI monomer solution 6 functions as a polymerizing agent or catalyst to polymerize the DAI monomers.

Figure 1B:
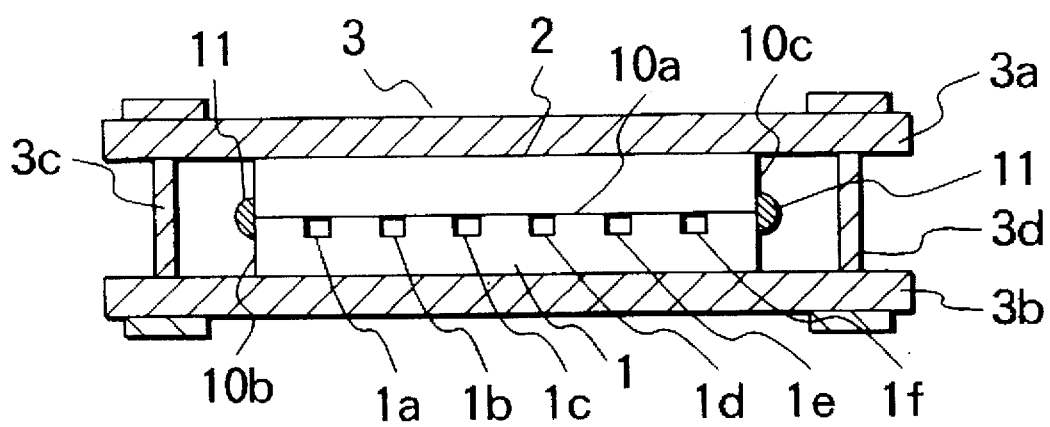

Next, the vacuum chamber 4 is evacuated to a vacuum of $10^{-4}$ Torr until the gas contained in the DAI monomer solution 6 is removed, then, the clamping tool 3 is moved downward using the holder 5 to dip the open ends of capillaries 1a through 1f shown in FIGS. 1A and 1B into the DAI monomer solution.

When the vacuum in the vacuum chamber 4 is released so that the pressure gradually rises from a vacuum to atmospheric pressure, the pressure in the capillaries become less relative to the pressure around the DAI monomer solution 6, and the DAI monomer solution 6 is forced into the capillaries. When relatively long capillaries are filled with the monomer solution, the utilization of pressure difference using a vacuum so as to assist the capillary action facilitates the monomer filling process.

After the capillaries have been filled with the DAI monomer solution 6, and the pressure in the vacuum chamber 4 has reached atmospheric pressure, the clamping tool 3 is removed from the holder 5, and the DAI monomer solution 6 is polymerized by heating at a temperature of 85° C. for 6 hours using an oven.

When the monomer is polymerized, since the polymer acts as an adhesive to bond the patterned substrate 1 and the plane substrate 2, the area where the pattern of the optical waveguide has been formed becomes a region enough for bonding (bonding surface), and clamping the patterned substrate 1 and the plane substrate 2 is no longer required. In the case of the pattern of a finer optical waveguide, a dummy pattern may be used to increase the surface area of this bonding surface.

Finally, the surface of the polymeric optical waveguide produced as described above is polished with a standard type polisher using an emulsion containing diamond of a diameter of 0.5 micrometer.

Thus the polymeric optical waveguide according the present invention is produced.

Next, the selection of polymer materials used in the method for producing a polymeric optical waveguide according to the present invention will be described.

First, in order to guide light in the core of a polymeric optical waveguide, the index of refraction of the patterned substrate and the plane substrate functioning as a clad must be larger than the index of the core.

Second, optical coupling to the core of the polymeric optical waveguide, that is, the coupling of the optical waveguide with optical components used for taking light into the core or taking light out of the core, must be considered. The numerical aperture (N.A.) is used as a parameter representing the optical properties of the optical waveguide. The N.A. is obtained from the index of refraction of the core, $n_{core}$ and the index of refraction of the clad (substrates), $n_{clad}$ of the optical waveguide using the following equation:

$$N.A.=[(n_{core})^2-(n_{clad})^2]^{1/2}$$

When an optical coupling to couple light into an optical waveguide is considered, the N.A. becomes an index to indicate the range of angles of the incident light that can be coupled into the optical waveguide. The larger N.A. value indicates that light from a wider angle can be coupled into the optical waveguide. When the optical coupling for taking light into an optical waveguide using a lens is considered, since light is not guided into the optical guide if the N.A. of the lens is larger than the N.A. of the optical waveguide, that is some component of the light is not introduced into the optical waveguide, the N.A. of the lens in the incident side of the optical waveguide must be smaller than the N.A. of the optical waveguide. In the design of the optical system of a practical optical device, therefore, N.A. is an important factor.

Since acrylic polymers such as polymethyl methacrylate (PMMA) or polycarbonates, which excel in optical properties and temperature and chemical stabilities, are frequently used as the polymer material used in typical substrates, the polymer material for the core may be selected according to the index of refraction of the core, considering N.A. and the index of refraction of the material for the substrate.

Third, the monomer material must be able to be used in a liquid state when the core of the optical waveguide is produced, and also must not dissolve the polymer material used for the substrate.

Also, the monomer, which produces no by-products, and polymerizes at a relatively low temperature (100° C. or below) during the polymerization reaction, is preferred.

In this embodiment, considering the above requirements, polymethyl methacrylate (PMMA) was used as the material for the patterned substrate and the plane substrate, and diallyl isophthalate (DAI) was used as the material for the core of the optical waveguide.

In the polymeric optical waveguide produced in this embodiment, since the index of refraction of PMMA was 1.49, and the index of refraction of DAI was 1.59, the N.A. was 0.55.

Figure 3:
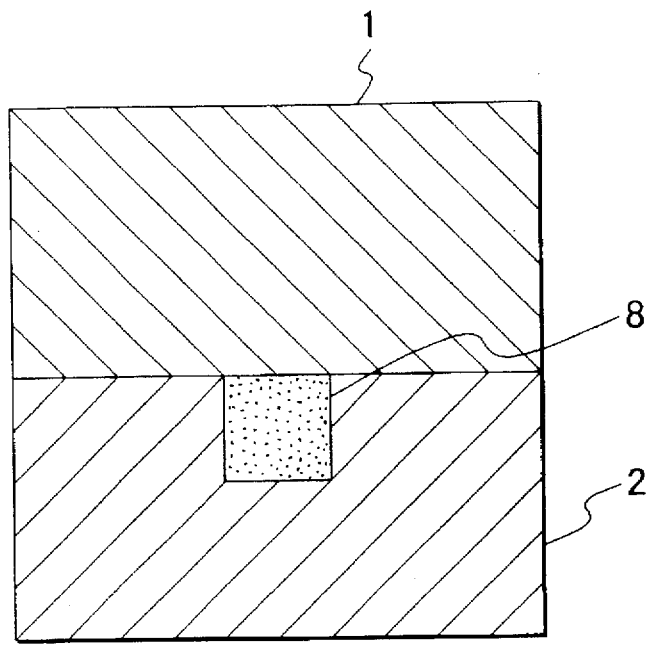
FIG. 3 is a diagram showing the result of observation of light coming out of the end of the polymeric optical waveguide produced according to the present invention.

Light was allowed to enter the inlet end of the core of the polymeric optical waveguide produced as described above using an objective lens for a microscope having a magnification of 20 and an N.A. of 0.4, and the light coming out of the outlet end of the core of the polymeric optical waveguide was observed. As described above, since the N.A. of the polymeric optical waveguide produced in this embodiment was 0.55, the microscopic objective lens for having an N.A. of 0.4 was used considering the optical coupling at the inlet end. An enlarged view of the light coming out of the outlet end of a core is shown in FIG. 3 as a result of observation. As FIG. 3 shows, since the monomer solution which becomes the material of the core 8 did not leak into the interface between the patterned substrate 1 and the plane substrate 2 of the polymeric optical waveguide produced in this embodiment to form a gap, the incident light did not leak in the interface, and was guided only through the core 8, then came out of the outlet end of the core 8.

As the second embodiment, the method for filling the capillaries of the optical waveguide with a monomer solution by evacuating each capillary from an open end so as to assist a capillary phenomenon unlike the first embodiment will be described.

The patterned substrate and the plane substrate were fabricated in the same manner as in the first embodiment. The patterned substrate was made to contact to the plane substrate using the clamping tool 3 shown in FIGS. 1A and 1B in the same manner as in the first embodiment. However, although three sides of the clamped substrates were sealed using a sealing resin in the first embodiment, no sides were sealed using a sealing resin in this embodiment because no sealing was required. As required, however, only the sides 10b and 10c, shown in FIG. 1B, may be sealed using a sealing resin.

The same materials for the substrates and the monomer as in the first embodiment were used.

Next, the method for filling the capillaries with a monomer solution, which is the material of the core, will be described referring to FIG. 4.

Figure 4:
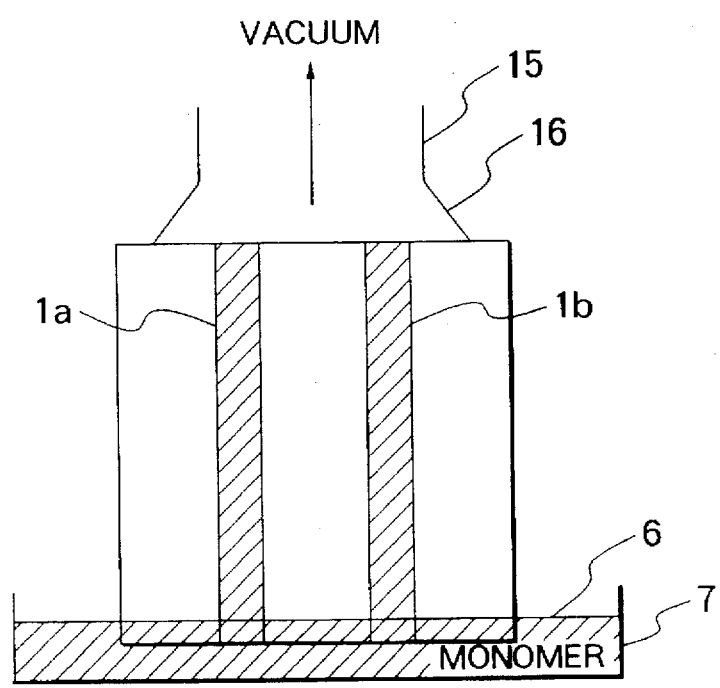
FIG. 4 is a diagram illustrating the process for filling the capillaries with a monomer solution which is the material for the core of the second embodiment according to the present invention.

As FIG. 4 shows, an open end of each of capillaries 1a and 1b formed between the patterned substrate and the plane substrate clamped using a clamping tool was dipped into the monomer solution 6 contained in a vessel 7. An end of an evacuating duct 15, the other end of which is connected to a vacuum apparatus (not shown), is made to contact to the other open ends of the capillaries, to fill the capillaries 1a and 1b with the monomer solution. In this case, if a cover 16 made of rubber and the like to cover entire surface of the optical waveguide to be evacuated is attached to the end of the evacuating duct 15, all the capillaries may be filled simultaneously.

Thereafter, in the same manner as in the first embodiment described above, the monomer in the capillaries was polymerized and the sides of the substrates are polished as in the first embodiment.

As described above, the polymeric optical waveguide according to the second embodiment is produced.

Light was allowed to enter the inlet end of the core of the polymeric optical waveguide produced according to the second embodiment under the same conditions as in the first embodiment, and the light coming out of the outlet end of the core was observed. As the result of observation, the same results as in the first embodiment as shown in FIG. 3 was obtained. That is, since the monomer solution which becomes the material of the core 8 did not leak in the interface between the patterned substrate 1 and the plane substrate 2 of the polymeric optical waveguide produced in this embodiment to form a gap, the incident light did not leak in the interface, and was guided only through the core 8, then came out of the outlet end of the core 8.

Although the description of the process for degassing the monomer solution to become the material of the core was omitted in the second embodiment, this process is essential for producing an optical waveguide with low loss.

In the above first and second embodiment, the number of grooves on the patterned substrate, that is the number of capillaries shown in the drawings is just for illustrating the concept, and the present invention is not limited to such a number. Also, the shape of the capillaries is not limited to the linear shape in the above embodiments, but capillaries having curved parts may be used.

Also, in the above first and second embodiment, although the monomer filled in the capillaries are polymerized by heating, the present invention is not limited to this, but the method of polymerization, for example, the irradiation by ultraviolet light, may be selected depending on the monomer materials.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for producing a polymeric optical waveguide comprising the steps of:
    allowing the patterned surface of a substrate on which the pattern of at least one groove for constituting at least one capillary to contact with a planar substrate to form at least one capillary from said at least one groove by clamping the outer surfaces of the two substrates;
    sealing sides of the clamped two substrates except for at least one open end of said at least one capillary;
    filling said at least one capillary with a monomer solution which is a material for a core of an optical waveguide utilizing a capillary action phenomenon through said at least one open end of said at least one capillary; and
    polymerizing said monomer solution.

2. A method for producing a polymeric optical waveguide according to claim 1, wherein polymethyl methacrylate (PMMA) is used as a material for the patterned substrate and the plane substrate, and diallyl isophthalate (DAI) is used as a material for the core of the optical waveguide.

3. A method for producing a polymeric optical waveguide comprising the steps of:
    allowing the patterned surface of a substrate on which the pattern of at least one groove for constituting at least one capillary to contact with a planar substrate to form at least one capillary from said at least one groove by clamping the outer surfaces of the two substrates;
    sealing sides of the clamped two substrates except for one open end of said at least one capillary;
    evacuating inside said at least one capillary and around a monomer solution which is a material for a core of an optical waveguide;
    dipping said one open end of said at least one capillary not sealed in said monomer solution;
    filling said at least one capillary with said monomer solution through said one open end by gradually raising pressure around said monomer solution from a vacuum to atmospheric pressure; and
    polymerizing said monomer solution.

4. A method for producing a polymeric optical waveguide according to claim 3, wherein polymethyl methacrylate (PMMA) is used as a material for the patterned substrate and the plane substrate, and diallyl isophthalate (DAI) is used as a material for the core of the optical waveguide.

5. A method for producing a polymeric optical waveguide comprising the steps of:
    allowing the patterned surface of a substrate on which the pattern of at least one groove for constituting at least one capillary to contact with a planar substrate to form at least one capillary from said at least one groove by clamping the outer surfaces of the two substrates;
    dipping an open end of said at least one capillary in a monomer solution which is a material for a core of an optical waveguide;
    filling said at least one capillary with said monomer solution by evacuating said at least one capillary from another of the open ends thereof; and
    polymerizing said monomer solution.

6. A method for producing a polymeric optical waveguide according to claim 5, wherein polymethyl methacrylate (PMMA) is used as a material for the patterned substrate and the plane substrate, and diallyl isophthalate (DAI) is used as a material for the core of the optical waveguide.

7. A method for producing a polymeric optical waveguide according to claim 1, wherein said clamping is carried out so as to exert pressure to make the patterned substrate contact with the plane substrate without bending or breaking the two substrate.

8. A method for producing a polymeric optical waveguide according to claim 1, wherein a sealing resin is used as a material for said sealing.

9. A method for producing a polymeric optical waveguide according to claim 3, wherein said clamping is carried out so as to exert pressure to make the patterned substrate contact with the plane substrate without bending or breaking the two substrates.

10. A method for producing a polymeric optical waveguide according to claim 3, wherein a sealing resin is used as a material for said sealing.

11. A method for producing a polymeric optical waveguide according to claim 5, wherein said clamping is carried out so as to exert pressure to make the patterned substrate contact with the plane substrate without bending or breaking the two substrates.

* * * * *